United States Patent Office 2,742,503
Patented Apr. 17, 1956

2,742,503

PRODUCTION OF IMINO SUBSTITUTED ACETONES AND THEIR HYDROLYSIS TO SUBSTITUTED ACETONES

Virgil L. Hansley, Cincinnati, Ohio, assignor to E. I. du Pont de Nemours and Company, Wilmington, Del., a corporation of Delaware No Drawing. Application November 2, 1951,
Serial No. 254,645

8 Claims. (Cl. 260—566)

This invention relates to the production of imino acetones by reactions of sodium with certain tertiary nitriles, and to the hydrolysis of such compounds to substituted acetones in which all hydrogen atoms of the acetone molecule have been replaced by hydrocarbon radicals.

It is an object of the invention to provide a new method of producing substituted acetones in which all hydrogen atoms of the acetone molecule are replaced by hydrocarbon radicals. A further object is the production of such compounds by the hydrolysis of products from the reaction of metallic sodium with certain tertiary nitriles. A still further object is to provide a method for reacting sodium with certain tertiary nitriles, whereby sodium salts of imino acetones are obtained which are hydrolyzable to the corresponding imino compounds, which in turn are hydrolyzable to substituted acetones. A particular object, is to provide a method of obtaining the sodium salt of imino hexamethyl acetone, of hydrolyzing the salt to imino hexamethyl acetone, and of hydrolyzing the latter to hexamethyl acetone. Still further objects of the invention will be apparent from the following description.

The above objects are accomplished in accordance with the invention by reacting metallic sodium with a tertiary nitrile of the type defined below to obtain a sodium salt of an imino acetone, the structure of which includes a hydrocarbon substituent group in place of each hydrogen atom of the acetone molecule. Upon hydrolysis of the above salt with water, the corresponding imino acetone is obtained and hydrolysis of the latter with an aqueous solution of a strong mineral acid yields a substituted acetone having a structure which includes a hydrocarbon substituent group in place of each hydrogen atom of the acetone molecule.

Illustrative of the reactions involved in practicing the invention are the following reactions showing the preparation of hexamethyl acetone using trimethyl acetonitrile as the starting nitrile:

(A) $2(CH_3)_3CCN + 2Na \longrightarrow (CH_3)_3CCC(CH_3)_3 + NaCN$
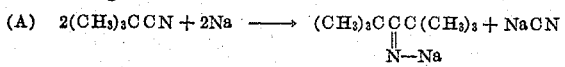

| Trimethyl acetonitrile | Sodium salt of imino hexamethyl acetone |

(B)
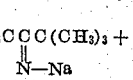
$(CH_3)_3CCC(CH_3)_3 + H_2O \longrightarrow (CH_3)_3CCC(CH_3)_3 + NaOH$
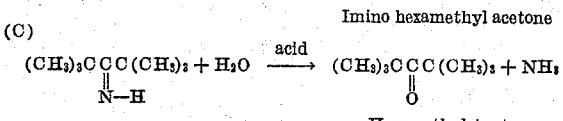

Imino hexamethyl acetone (C)
$(CH_3)_3CCC(CH_3)_3 + H_2O \xrightarrow{acid} (CH_3)_3CCC(CH_3)_3 + NH_3$
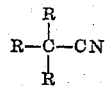

Hexamethyl Acetone

The tertiary nitriles which can be used successfully in practicing the invention are those having the general formula:

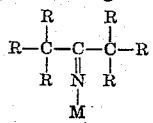

In the above formula, the R radicals are hydrocarbon radicals from the group consisting of the aryl radicals, the aralkyl radicals, and the saturated and ethylenically unsaturated acyclic and alicyclic radicals, and two such R's combined may represent a completed alicyclic ring in which is present the carbon atom to which is directly bonded the carbon atom bearing the nitrogen atom.

The following nitriles are illustrative of those which can be used in accordance with the invention, most of which nitriles may be prepared by the method of U. S. Patent 2,455,995:

Trimethyl acetonitrile
Dimethyl ethyl acetonitrile
Dimethyl neopentyl acetonitrile
Dimethyl isopropyl acetonitrile
Phenyl dimethyl acetonitrile
Triethyl acetonitrile
Methyl diethyl acetonitrile
Dimethyl n-propyl acetonitrile
Triphenyl acetonitrile
Tribenzyl acetonitrile
Methyl ethyl t-butyl acetonitrile
Dimethyl n-butyl acetonitrile
Dimethyl n-amyl acetonitrile
Diethyl n-propyl acetonitrile
Dimethyl t-butyl acetonitrile
Dimethyl n-hexyl acetonitrile
2-methyl-5-ethyl-5-cyano-heptane
3,7-dimethyl-7-cyano-octane
2,3-dimethyl-4-ethyl-4-cyano-hexane
2,3,4-trimethyl-4-cyano-pentane
2-methyl-2-cyano-butene-3
1-methyl-1-cyano-cyclohexane The sodium salts of the imino acetones obtained by reacting metallic sodium with the above tertiary nitriles, and the imino acetones resulting from the hydrolysis of such salts with water, have the general formula:

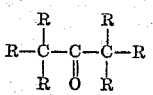

in which the R radicals have the significance stated above with respect to the formula for the starting nitriles, and in which M is hydrogen or sodium.

Hydrolysis of the above imino acetones with an aqueous solution of a strong mineral acid gives substituted acetones of the general formula:

$$R-\underset{\underset{R}{|}}{C}-\underset{\underset{O}{||}}{C}-\underset{\underset{R}{|}}{C}-R$$

in which the R radicals have the significance stated above with respect to the formula for the starting nitriles, except that when two R's are combined to form a completed ring, that ring will include a carbon atom which is directly bonded to the carbonyl (—CO—) group.

The invention is further illustrated by the following examples:

EXAMPLE 1

To a stirred suspension of 54 grams of finely divided sodium in 452 grams of petroleum ether there was added 166.2 grams of trimethyl acetonitrile. 2 cc. of methyl cellosolve was also added to "clean" the surfaces of the sodium particles. The reaction temperature was held with stirring and cooling to between 26 and 32° C. The trimethyl acetonitrile was added slowly over a period of 1½ hours. An excess of water was then added slowly to the reaction mixture at a temperature of 20 to 60° C. The water layer was separated from the organic layer and the latter fractionally distilled at atmospheric pressure. 76.5 grams of a product was isolated having a boiling range of 164 to 170° C. This partially refined material was basic in reaction and had a neutralization equivalent of 151. The calculated value for imino hexamethyl acetone is 141. Refractionation at atmospheric pressure showed a boiling point for this compound of 165.6° C. Hydrolysis of this imino hexamethyl acetone by adding thereto about 1 liter of a 10% by weight solution of sulfuric acid in water for each gram mole of the acetone and then steam distilling the resulting mixture gave the previously known hexamethyl acetone, B. P. 152.3° C., which separated as a separate phase from the condensate from the steam distillation. A Bouveault-Blanc reduction of this ketone gave the known di-tertiary butyl carbinol, M. P. 52.5° C., B. P. 169.5° C.

Illustrative of the reduction of hexamethyl acetone to di-tertiary butyl carbinol, 494 grams of hexamethyl acetone, made as described in the above example, was placed in a 3-liter, 3-necked flask with one liter of absolute ethanol. 200 grams of metallic sodium was added in small pieces over a period of 1 hour to the contents of the flask while the reaction mixture was held at the reflux point of the mixture. As determined by the amount of hydrogen evolved, the reduction obtained was equivalent to 93% of that required for converting the ketone to di-tertiary butyl carbinol. The reaction mixture was hydrolyzed by the cautious addition of water and the carbinol was isolated by fractional distillation. It distilled over a range of 165 to 170° C. A middle fraction distilling at 169.5° C., had a melting point of 52.5° C. and exhibited a strong camphor-like odor which is characteristic of this carbinol.

Other preparations of imino hexamethyl acetone were carried out under the conditions indicated in the following table of results:

*Gram moles*

| Example | Sodium | TMA* | Solvent | Reaction Temp. (° C.) | Percent Yield of Imino Hexamethyl Acetone |
|---|---|---|---|---|---|
| 2 | 3.3 | 3.0 | Kerosene | 35 | 80 |
| 3 | 3.3 | 3.0 | do | 35 | 54 |
| 4 | 3.3 | 3.0 | do | 20 | 49 |
| 5 | 3.3 | 3.0 | do | 80 | 43 |
| 6 | 3.3 | 3.7 | Petr. Ether | 15 | 56 |
| 7 | 10.0 | 10.5 | do | 15 | 63 |

*Trimethyl acetonitrile.

The above examples illustrate the use of trimethyl acetonitrile as the starting nitrile. Similar reactions can be carried out in accordance with the invention employing any of the tertiary nitriles having the general formula indicated previously.

In the reactions involving metallic sodium, it is preferred to employ about 1 to 1.2 moles of sodium for each mole of nitrile being reacted. However, greater or less proportions of sodium may be used, although if less than the theoretical amount is used, lower yields are realized, whereas if more than around a 20% excess is employed, the additional amount of sodium is largely wasted. The temperature at which the reaction with sodium is carried out may be varied considerably, e. g., from about −50 to about 100° C., the optimum being within the range of about 20 to 50° C. At temperatures below about −50° C. the reaction becomes sluggish whereas at temperatures above about 100° C., side reactions begin to occur at excessive rates. Pressure is not an important factor except that the pressure should be sufficiently high to assure a liquid phase reaction medium. Operation at about atmospheric pressure is generally most convenient.

It is preferred to carry out the reaction involving metallic sodium in a liquid reaction medium and to use sodium in a finely divided condition. Accordingly, it is preferred to carry out the reaction in the presence of a liquid which is inert to both of the reactants as well as to the reaction products, and which is also a solvent for the nitrile reactant. Typical of such solvents or diluents are the liquid paraffin hydrocarbons such as petroleum ether and kerosene. Sufficient of the solvent will be used to maintain the reaction mixture in a liquid condition.

The reaction involving hydrolysis of the sodium salt to the corresponding imino acetone is simply and effectively carried out by adding water to the salt, e. g., to the reaction mixture containing the intermediate salt. Generally, a considerable excess of water will be added in order to insure complete decomposition of any excess sodium and to hydrolyze all of the sodium salt of the imino compound to the corresponding imino acetone. This hydrolysis may be effective at any ordinary temperature such as 0° C. to 50° C., although higher temperatures may be employed if desired. Regardless of the amount of water employed in excess of that theoretically required, hydrolysis when using water alone does not proceed beyond the imino acetone stage.

Hydrolysis of the imino acetones to the corresponding substituted acetones is effected employing an aqueous solution of any strong mineral acid, such as hydrochloric acid, sulfuric acid or phosphoric acid. Dilute aqueous solutions containing, e. g., about 2 to 15% by weight of the acid, are preferably used at temperatures ranging from about room temperature to about the atmospheric boiling temperature of the solution. Considerably, higher or lower temperatures may be used if desired. Under the most preferred conditions, about 1 liter of water containing from 1 to 3 neutralizing equivalents of the acid per mole of the imino acetone will be employed. The resulting substituted acetone is conveniently steam distilled from this acid hydrolysis mixture.

While the above conditions are generally applicable in carrying out reactions starting with any of the tertiary nitriles indicated previously, they are particularly applicable to the reactions involved when trimethyl acetonitrile is a starting reactant. When other nitriles are employed, the preferred reaction conditions may vary somewhat from those indicated above.

The present imino acetones are useful chemical intermediates. They can be hydrolyzed to the corresponding substituted acetones which then can be hydrogenated to the corresponding carbinol compounds. Thus, imino hexamethyl acetone can be hydrolyzed to hexamethyl acetone which can be hydrogenated to di-tertiary butyl carbinol. Imino hexamethyl acetone also can be polymerized to obtain polymers and copolymers useful for specific applications.

I claim:

1. The method of preparing a sodium salt of an imino acetone having the formula:

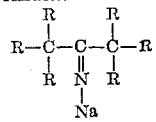

wherein the R radicals are hydrocarbon radicals such of which contains not more than 7 carbon atoms and is selected from the group consisting of the phenyl and benzyl radicals and the saturated and ethylenically unsaturated acyclic and alicyclic radicals, and wherein two such R's directly attached to the same carbon atom can, when taken together with said carbon atom, form a completed alicyclic ring having 6 carbon atoms in which is present a carbon atom which is directly bonded to the carbon atom bearing the nitrogen atom, comprising reacting metallic sodium with a tertiary nitrile of the formula:

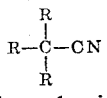

wherein the R radicals have the significance stated above.

2. The method of preparing an imino acetone of the formula:

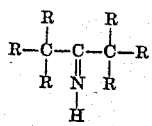

wherein the R radicals have the significance stated in claim 1, comprising preparing a salt in accordance with the method of claim 1 and hydrolyzing said salt by reacting the same with water.

3. The method of preparing a substituted acetone of the formula:

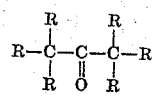

wherein the R radicals are hydrocarbon radicals each of which contains not more than 7 carbon atoms and is selected from the group consisting of the phenyl and benzyl radicals and the saturated and ethylenically unsaturated acyclic and alicyclic radicals, and wherein two such R's directly attached to the same carbon atom, can, when taken together with said carbon atom, form a completed alicyclic ring having 6 carbon atoms in which is present a carbon atom which is directly bonded to the carbonyl group, comprising preparing a salt in accordance with the method of claim 1, hydrolyzing said salt with water, and hydrolyzing the resulting imino acetone with an aqueous solution of a strong mineral acid.

4. The method of preparing sodium imino hexamethyl acetone comprising reacting metallic sodium with trimethyl acetonitrile.

5. The method of preparing imino hexamethyl acetone comprising reacting metallic sodium with trimethyl acetonitrile and hydrolyzing the resulting sodium imino hexamethyl acetone with water.

6. The method of preparing hexamethyl acetone comprising reacting metallic sodium with trimethyl acetonitrile, hydrolyzing the resulting sodium imino hexamethyl acetone with water, and hydrolyzing the resulting imino hexamethyl acetone with an aqueous solution of a strong mineral acid.

7. A compound of the formula:

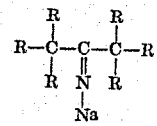

wherein the R radicals are hydrocarbon radicals each of which contains not more than 7 carbon atoms and is selected from the group consisting of the phenyl and benzyl raidcals and the saturated and unsaturated acyclic and alicyclic radicals, and wherein two such R's directly attached to the same carbon atom can, when taken together with said carbon atom, form a completed alicyclic ring having 6 carbon atoms in which is present a carbon atom directly bonded to the carbon atom bearing the nitrogen atom.

8. Sodium imino hexamethyl acetone.

References Cited in the file of this patent

UNITED STATES PATENTS

| | | |
|---|---|---|
| 2,026,386 | Howland | Dec. 13, 1935 |
| 2,230,774 | Bockmuhl et al. | Feb. 4, 1941 |
| 2,265,949 | Loder et al. | Dec. 9, 1941 |
| 2,513,996 | Haury | July 4, 1950 |

FOREIGN PATENTS

| | | |
|---|---|---|
| 573,722 | Germany | Apr. 5, 1933 |
| 583,565 | Germany | Sept. 21, 1933 |

OTHER REFERENCES

Degering: "An Outline of Org. Nitrogen Compounds" (1945), pp. 509–10.

Sidgwick: "Org. Chem. of Nitrogen" (1937), pp. 315–16.

Moureu: Annales de Chimie, ser. 9, vol. 14, pp. 322–59 (1920).

Beilsteins Handbuch der Organischen Chemie, vol. 7, p. 416.